(12) United States Patent
Webb

(10) Patent No.: US 8,061,754 B1
(45) Date of Patent: Nov. 22, 2011

(54) HEAVY DUTY CARGO BED EXTENDER WITH RAMP FOR PICKUP TRUCKS

(76) Inventor: Terry K. Webb, Tarboro, NC (US)

( * ) Notice: Subject to any disclaimer, the term of this patent is extended or adjusted under 35 U.S.C. 154(b) by 0 days.

(21) Appl. No.: 12/793,125

(22) Filed: Jun. 3, 2010

(51) Int. Cl.
*B60P 3/06* (2006.01)

(52) U.S. Cl. ....... 296/61; 296/57.1; 296/26.08; 14/71.1; 414/537

(58) Field of Classification Search ............... 296/26.08, 296/57.1, 59, 61; 414/537; 14/69.5; 119/847
See application file for complete search history.

(56) References Cited

U.S. PATENT DOCUMENTS

| | | | |
|---|---|---|---|
| 4,647,270 A * | 3/1987 | Maloney | 414/470 |
| 5,156,432 A | 10/1992 | McCleary | |
| 5,988,725 A | 11/1999 | Cole | |
| 6,076,215 A * | 6/2000 | Blankenship et al. | 14/71.1 |
| 6,250,874 B1 | 6/2001 | Cross | |
| 6,513,690 B1 * | 2/2003 | Churchill et al. | 224/498 |
| 6,536,822 B1 | 3/2003 | Vagedes et al. | |
| 6,739,639 B1 | 5/2004 | Chumley et al. | |
| 7,070,220 B1 | 7/2006 | Lantaigne | |
| 7,703,825 B2 * | 4/2010 | Brown | 296/26.08 |
| 2006/0133915 A1 * | 6/2006 | Day | 414/537 |
| 2008/0159838 A1 * | 7/2008 | Sherer | 414/537 |
| 2008/0174138 A1 * | 7/2008 | Huggins | 296/61 |
| 2008/0292438 A1 * | 11/2008 | Patterson | 414/537 |
| 2010/0266378 A1 * | 10/2010 | Verwys | 414/537 |

OTHER PUBLICATIONS

Buyers Dual Hitch Extension, Model# 1804010, http://www.northerntool.com/webapp/wcs/stores/servlet/product_6970_492929_492929, Jan. 29, 2010.

* cited by examiner

*Primary Examiner* — Jason S Morrow
(74) *Attorney, Agent, or Firm* — Jim Passe; Passe Intellectual Property, LLC

(57) ABSTRACT

The present invention provides an assembly for extending the bed of a pickup truck, having a hitch receiver and a down folded tailgate past the end of tailgate and providing a ramp function. By supporting the assembly by both an attachment to the hitch receiver and supporting the assembly on the down folded tailgate the assembly can support more weight and at greater distances and angles the previous bed extenders and ramp combinations.

9 Claims, 4 Drawing Sheets

HEAVY DUTY CARGO BED EXTENDER WITH RAMP FOR PICKUP TRUCKS

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a pickup truck bed extender with a ramp. In particular, it relates to a bed extender and ramp capable of extending the bed past normal ramps and extenders and supporting heavy duty equipment.

2. Description of Related Art

Pickup trucks are generally used for transporting both light weight and heavy weight objects. A particular problem is that the bed of a pickup is limited in length and in addition it is difficult to place heavy objects, such as equipment or the like, into a truck bed. One solution has been to remove the pickup truck tailgate or to travel with the gate in the down position. However, this presents problems as objects longer than the bed or down tailgate are not supported underneath.

Further, the ability to support heavier objects has not been addressed with the myriad of pickup truck ramp/extenders. Typically, they support the ramp on one of the attachments to a trailer hitch, cables to the truck body, the bumper or the like. While this provides some support it is only lightweight support and does not provide much horizontal support, if at all, past where the tailgate ends or would end if there were a tailgate.

In U.S. Pat. No. 6,250,874 there is disclosed a cargo ramp which does not extend the bed and is supported entirely by placement in the trailer hitch. It is designed to be used in conjunction with the tailgate in the down position. The ramp extends at quite a distance and suffers from such poor weight distribution that only light weights will prevent the hitch being torn off the truck during use.

BRIEF SUMMARY OF THE INVENTION

The present invention relates to the discovery of a method and device for extending the bed of a pickup truck past the end of the tailgate and providing heavy duty support for items placed thereon and provides a heavy duty ramp to load items.

In particular, the present invention relates to an assembly for extending the bed of a pickup truck having a hitch receiver and a down folded tailgate past the end of tailgate and providing a ramp function comprising:

a) an L-shaped hitch arm having a horizontal branch for slidably engaging the hitch receiver, an upright branch having a top end that meets the end of the down folded tailgate and a diagonal support beam between the horizontal and upright branch, b) a support panel having a tailgate end for positioning on the tailgate and receiving support therefrom wherein the tailgate end is attached to the top end of the upright branch, c) a first panel having a first and second end the first end attached to the tailgate end of the support panel by a hinge assembly having at least one adjustable diagonal support beam between the L shaped hitch arm and a bottom of the first panel for supporting the panel horizontal to the support plate wherein the hinge assembly allows the first panel to assume a stowed position, a horizontal position and a ramp position, d) a pair of support legs positioned at or near the first panel second end for supporting the first panel in a ramp position, and e) a second panel having a first and second end, the first end attached to the second end of the first panel by a hinge assembly and wherein the second end can rest on the ground when the first panel is in the ramp position and rest on the first panel when folded inward on the hinge assembly.

DETAILED DESCRIPTION OF THE INVENTION

Figure 1:
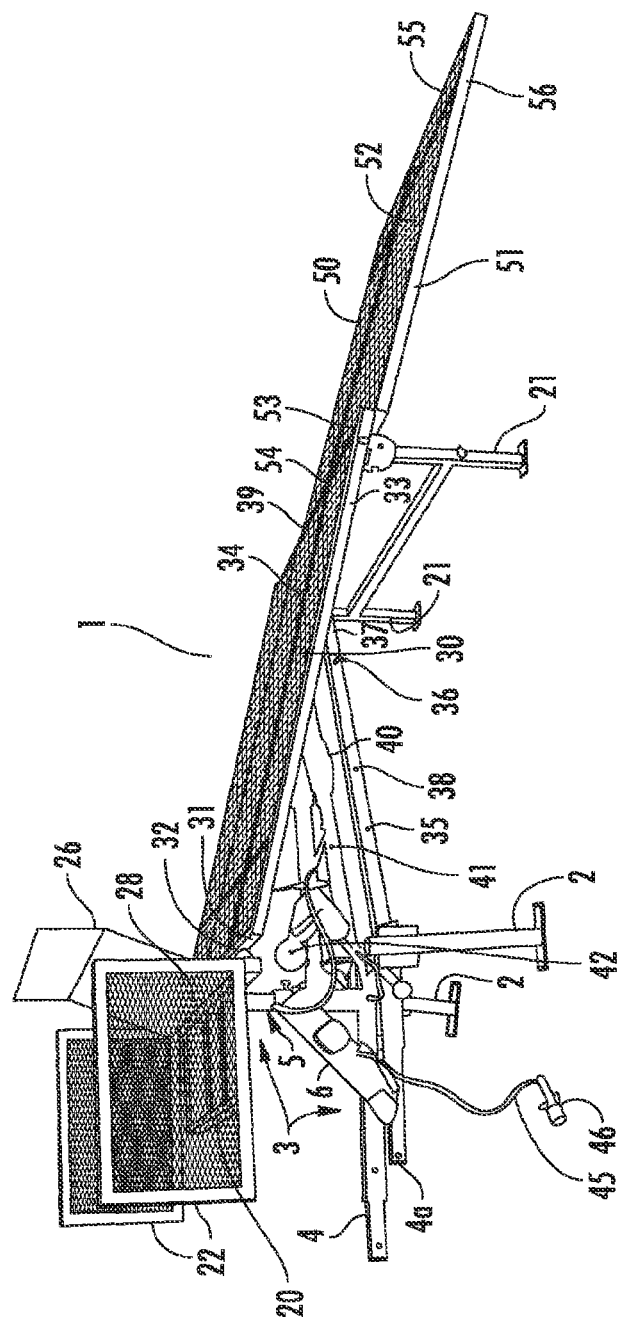
FIG. 1 is a perspective view of an embodiment of the assembly supported on the ground in position to be attached to a pickup truck.
Figure 1:
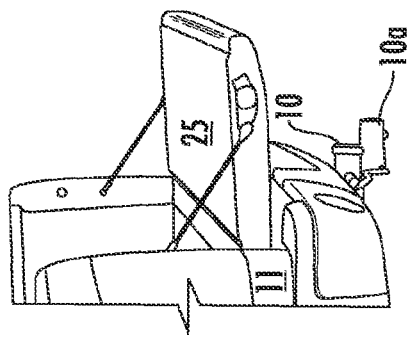

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

The "assembly" of the present invention relates to a device for attachment to a pickup truck for extending the bed length beyond the end of the down folded tailgate and to provide a ramp function. The design of the present invention is such that the assembly provides greater weight support than previous assemblies and thus, can accomplish support and utilities that previous type devices could not achieve.

As used herein the "L-shaped hitch arm" is a two branch device for attaching to the hitch receiver of a pickup truck and to a support panel which rests on the tailgate. This attachment/support construction gives the assembly unusual strength and support and allows the extended bed function of the present invention. The hitch arm has a horizontal piece which is shaped to slidably engage the hitch receiver. In one embodiment a second hitch receiver is mounted below the first on the truck and a hitch receiver extension on the assembly for insertion in the second receiver. Thus even while having the assembly attached, the user can attach another vehicle behind the assembly.

The hitch arm has a second upright branch at or about a 45 degree angle from the essentially horizontal branch. The length of the horizontal arm is such that the upright branch clears the end of the tailgate when in the down position but relatively close to that end. Because trucks vary from the distance of a hitch to the level of the tailgate, one constructing the hitch arm can make one specifically for the truck it is attached to or position an adjustable height upright branch for matching the top of the upright to the end of the tailgate.

In order to provide lateral and horizontal support to the hitch arm, a diagonal support beam is utilized between the horizontal and upright branches. While 45 degree angles are utilized in one embodiment, other angles and positions between the two branches can be utilized as desired or to maximize the support. Clearly, multiple support beams could also be utilized.

The hitch arm and essentially most of the parts of the assembly can be tubular (square or round) steel or iron. Panels can be steel tubing with expanded steel or other material to create a flooring surface on the panels. In addition, the panels could be covered with "diamond steel" patterned steel sheets for creating a surface without holes.

At the top end of the upright branch is attached a "support panel". The support panel rests on the tailgate and is attached to the top upright branch at its tailgate or rear end. It can be generally rectangular or essentially any shape to fit over and rest on a substantial portion of the tailgate. In other words, the support panel is parallel to and right above the horizontal branch this part of the assembly where the hitch arm and support panel form a C-shape and are supported by both the hitch receiver and the surface of the tailgate in the down position. The left and right sides of the support panel can also have upright side panels which extend the truck side panels out over the down tailgate. Typically, the optional hitch receiver on the assembly would be roughly at the intersection of the horizontal and upright branches. This C-shape portion creates sufficient support for the rest of the assembly. In one embodiment there is a cover panel (such as of a diamond steel plate) covering the support panel. The cover panel can be attached by fixed means removable means and in one embodiment it is attached by a hinge assembly.

A first support panel forms part of either the extended bed or the top part of the two part ramp depending on its position. The panel comprises a first and second end, and in some embodiments, the panel is rectangular and roughly the width of the truck bed. The first end is attached to the tailgate end of the support panel via a hinge assembly. The hinge assembly allows the first panel to rotate from a downward position, to a horizontal position, to an upright stowed position and in the stowed position can rest on the side panels. One method of fixing the first panel in a desired fixed position is by having one or more adjustable diagonal support arms by attaching a support arm that can change length and then fixed in one position, different positions can be achieved. Therefore, the first panel is to extend the truck bed, the panel is brought to the horizontal and the adjustable support lock at that position. The same can be done for the stowed or other positions. In one embodiment, the first panel and support arm(s) are moved by an attached motor. The motor can also hold torque on the support arms and panel and hold the first panel in place while the support arm is locked. While the optimum placement of the support arm can be determined by the particular use and size and the like in view of the disclosure herein, in one embodiment it is attached at one end to the intersection of the horizontal and upright branches of the hitch arm. The other end at a selected position on the underside of the first panel. Where the panel is motorized, one, two or more guide wheels can aid in keeping the panel straight and making sure there is no twisting during the movement of the panel. The main positions for the first panel are the stowed position, the horizontal (extended bed) position and the down or ramp position. Other positions and utilities could be devised as necessary with this assembly. In one embodiment there is a locking device, such as a pin and hole mechanism, for locking the support arm in a selected position. The arm could then be adjusted in length by sliding one tube inside another to lengthen or shorten the arm and a pin placed in a hole through both pieces to lock in place at the given position (e.g. the horizontal position)

When the first panel is in the ramp position, a pair of support legs toward or near the second end of the first panel can be positioned to provide support for the second end on the ground. The legs can be adjustable or not as needed for use and depends on the length of the panels and the like. The first panel length is determined by needs of the height of the truck and the like, but in general one embodiment is from about 2 to 6 or more feet in length.

The second panel also comprises a first and second end. The first end is attached to the first panel second end by a hinge means. In general the second panel has two main positions, the down ramp position and the folded onto the first panel position which will be the case during the extended bed use of the assembly and during the transportation or stowed position of the assembly. This part could also be motorized, but in one embodiment the second panel is rotated on the hinge assembly manually and optionally handles aid in the manual manipulation of the second panel. The second panel is of a length sufficient for the second end to reach the ground when the first panel is in the ramp position.

Now referring to the drawings, FIG. 1 is a perspective view of an embodiment of the assembly of the present invention in ramp position for attachment to a pickup truck. Assembly 1 is sitting on the ground supported by optional installation supporting legs 2 and supporting legs 21. The optional legs 2 raise the assembly 1 to a height where the hitch receiver 10 on pickup truck 11 is at the same height as the horizontal branch arm 4 of L-shaped hitch arm 3 so that the horizontal branch arm 4 can be slidably engaged with the hitch receiver 10 by backing up the pickup truck 11 into the assembly 1. The L-shaped hitch arm 3 also has upright branch 5 and diagonal support beam 6.

The top of upright branch 5 in this view can be seen attached to support panel 20 at the tailgate end 28 which is a rectangular tubing structure. On either side of the support panel 20 are optional upright side panels 22 which extend the sides of the pickup truck 11 sides. The support panel 20 is at a height such that when the assembly 1 is engaged by the pickup truck 11 the support panel will rest on the top of the tailgate 25. In this embodiment secondary pickup truck hitch receiver 10a is matched with optional assembly hitch receiver 4a positioned to extend the hitch receiver for attaching something behind the assembly during transportation. Fold down cover plate 26 is a diamond steel plate which folds down over support panel 20 for providing a surface for moving items over or resting items on.

First panel 30 is shown with its first end 31 attached to the tailgate end 28 of the support plate 20 by hinge 32. It consists of tubing sides 33 with an expanded steel covering 34. The first panel 30 is supported by adjustable diagonal arm 35 which attaches at one end to the L-shaped hitch 3 and the bottom of panel 30. Hole and pin lock 36 is used to lock the support to a particular length by sliding an inner tubing 37 in and out of outer tubing 38 to obtain the proper length.

In the depicted embodiment motor 40 on another diagonal arm 41 provides power to raise and lower panel 30 to the desired position rotating using hinge 32 as the pivot point. Follower wheels 42 aid in guiding the panel and motor. The motor receives power via cable 45 and plug 46 which can be attached to an electrical outlet (not shown) on a pickup truck.

A second panel 50 has first end 54 and second end 55. The first end 54 is attached to the second end 39 via hinge 53. Like the first panel 30 it is constructed of tubing 51 and expanded steel covering 52. The second end 55 rests on the ground for use as a ramp. In this embodiment the second panel is not motorized and can be folded up on to the first panel by grabbing handle 56 and lifting and rotating to a folded position as can be seen in other figures.

Figure 2:
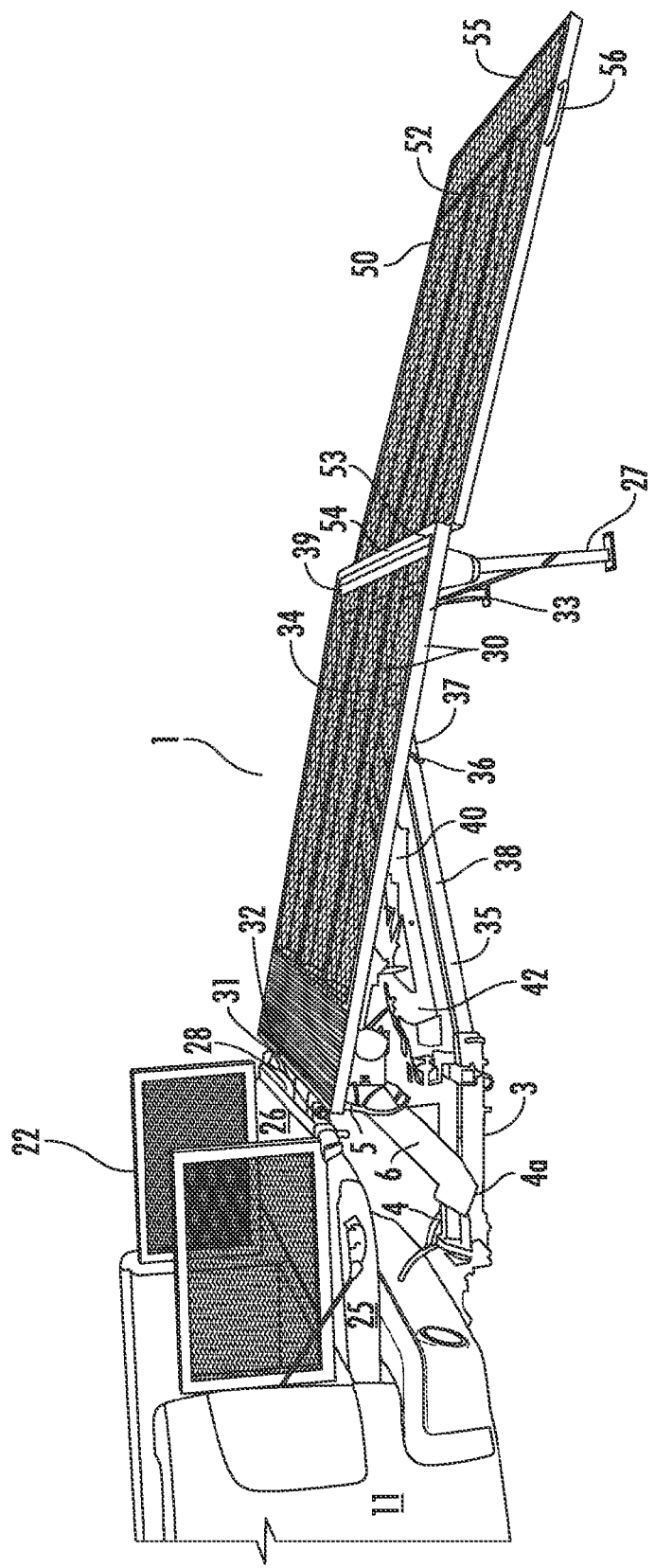
FIG. 2 is a perspective view of an embodiment of the assembly attached to a pickup truck.

FIG. 2 shows a perspective view of the assembly attached to the pickup truck 11 and the optional legs 2 removed. The assembly 1 is in position for loading onto the pickup 11.

Figure 3:
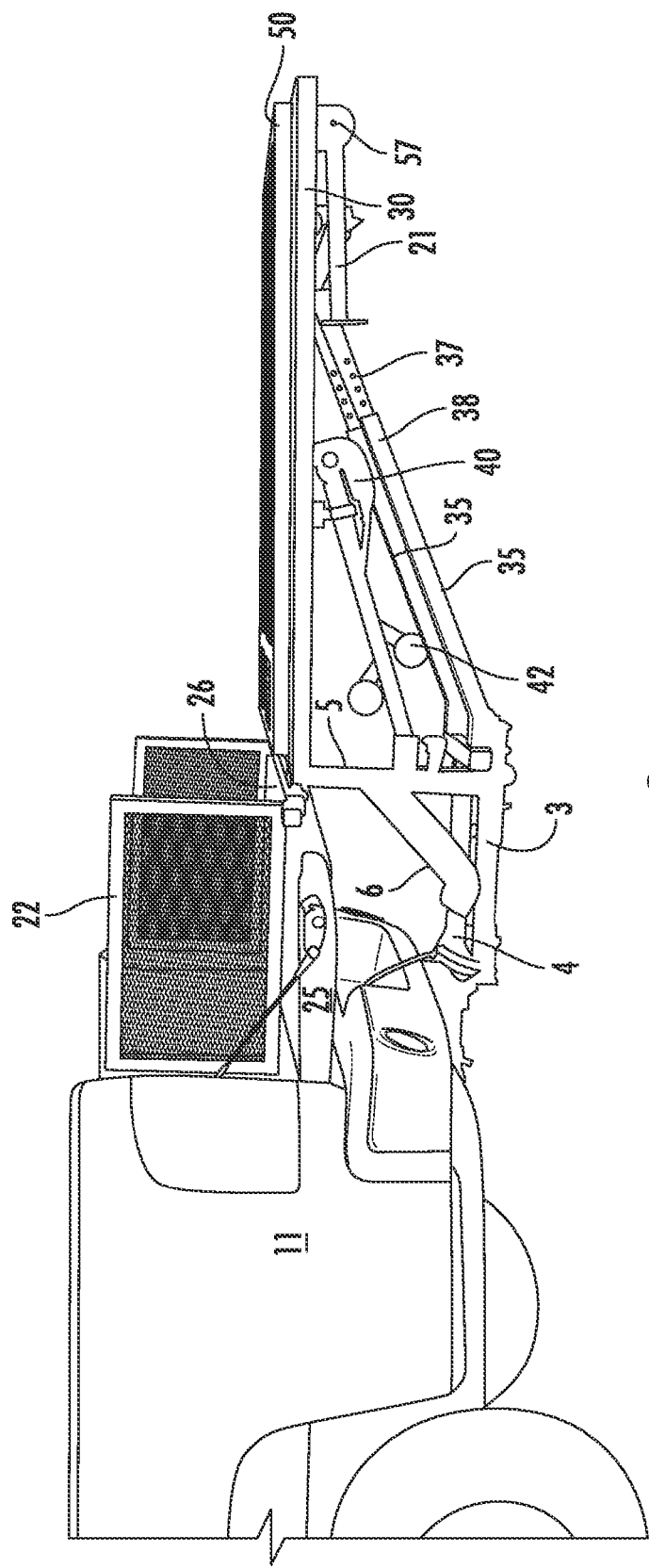
FIG. 3 is a perspective view of an embodiment of the assembly wherein the truck bed is extended past the end of the tailgate.

FIG. 3 depicts the assembly 1 wherein the motor 40 has caused the first panel 30 to come to a horizontal position and the second panel 50 has been manually folded over onto first panel 30. The diagonal support arm 35 has been adjusted in length to accommodate the change. In this position it can be seen that the pickup truck 11 has a horizontal platform for extending the bed of the truck past the end tailgate 25. The support legs 21 are show folded up and out of the way via hinge 57.

Figure 4:
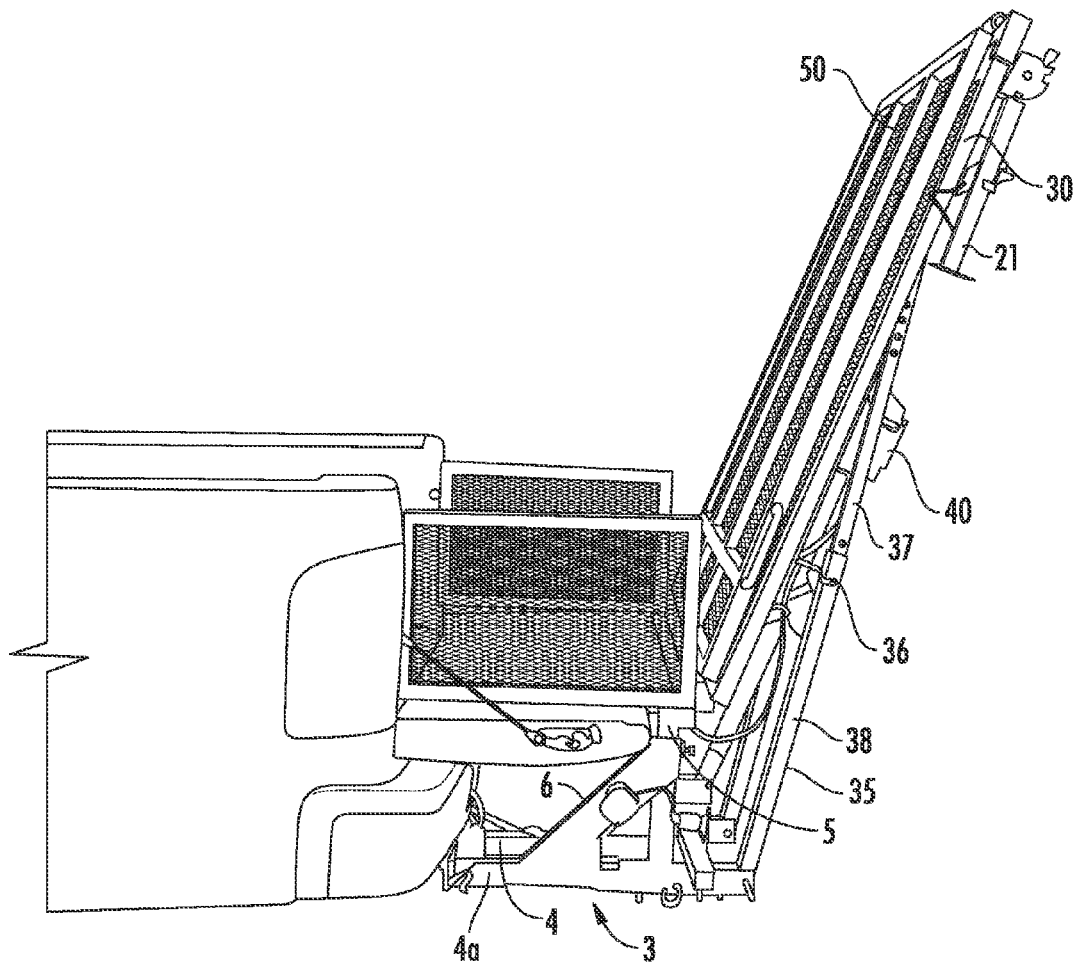
FIG. 4 is a perspective view of an embodiment of the assembly in a stowed position.

In FIG. 4 the first panel 30 has been further elevated by motor 40 to a stowed position suitable for diving when the extended bed function (position) is not utilized. Once again the change in diagonal support beam 35 can be clearly seen.

The example drawings are not intended to be limiting but applicant reserves the right to so limit the claims. In view of the present disclosure other substitutions of materials could be made as well as adaptive sizing and the like within the scope of the intended present invention.

What is claimed is:

1. An assembly for extending the bed of a pickup truck, having a hitch receiver and a down folded tailgate, past the end of tailgate and providing a ramp function comprising:
    a) an L-shaped hitch arm having a horizontal branch for slidably engaging the hitch receiver, an upright branch having a top end that meets the end of the down folded tailgate and a diagonal support beam between the horizontal and upright branch,
    b) a support panel having a tailgate end for positioning on the tailgate and receiving support therefrom wherein the tailgate end is attached to the top end of the upright branch,
    c) a first panel having a first and second end the first end attached to the tailgate end of the support panel by a hinge assembly having at least one adjustable diagonal support beam between the L shaped hitch arm and a bottom of the first panel for supporting the panel horizontal to the support plate wherein the hinge assembly allows the first panel to assume a stowed position, a horizontal position and a ramp position,
    d) a pair of support legs positioned at or near the first panel second end for supporting the first panel in a ramp position,
    e) a second panel having a first and second end the first end attached to the second end of the first panel by a hinge assembly and wherein the second end can rest on the ground when the first panel is in the ramp position and rest on the first panel when folded inward on the hinge assembly: and,
    f) wherein there are support legs for supporting the L-shaped hitch at a height for attaching the assembly to the truck hitch receiver.

2. An assembly according to claim 1 wherein the upright branch has an adjustable height.

3. An assembly according to claim 1 wherein the first panel has a motor for positioning the first panel.

4. An assembly according to claim 3 wherein there are 2 or more follower wheels for aiding in positioning the first panel.

5. An assembly according to claim 1 wherein there are one or more upright side panels on the support panel.

6. An assembly according to claim 1 wherein there is a cover plate on a top side of the support plate.

7. An assembly according to claim 1 which further comprises a hitch receiver.

8. An assembly according to claim 1 wherein there is a locking device for fixing the position of the adjustable diagonal support beam.

9. The assembly according to claim 1 wherein the assembly is attached to a pickup truck.

\* \* \* \* \*